(12) United States Patent
Kenyon et al.

(10) Patent No.: US 6,422,116 B1
(45) Date of Patent: *Jul. 23, 2002

(54) THROAT PLATE FOR A TOOL

(75) Inventors: Maria I. Kenyon, Taneytown; Michael L. O'Banion, Westminster, both of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/568,308

(22) Filed: May 9, 2000

Related U.S. Application Data

(63) Continuation of application No. 09/356,312, filed on Jul. 16, 1999, now Pat. No. 6,076,445, which is a continuation of application No. 09/151,421, filed on Sep. 10, 1998, now Pat. No. 5,970,835.

(51) Int. Cl.[7] .............................. B23D 19/00; B27C 9/00
(52) U.S. Cl. ........................ 83/477.2; 83/477; 144/1.1; 144/286.1; 144/286.5; 403/405.1; 403/409.1
(58) Field of Search .............................. 83/471.1, 471.2, 83/471.3, 477.1, 477.2; 144/1.1, 286.1, 286.5; 403/405.1, 408.1, 409.1

(56) References Cited

U.S. PATENT DOCUMENTS 5,970,835 A * 10/1999 Kenyon et al. ............ 83/477.2
6,076,445 A * 6/2000 Kenyon et al. ............ 83/477.2

* cited by examiner

*Primary Examiner*—W Donald Bray
(74) *Attorney, Agent, or Firm*—Adan Ayala

(57) ABSTRACT

An improved throat plate is disclosed herein. The throat plate includes a main body, an opening in the main body for allowing a cutting tool to extend therethrough, and a retainer assembly attached to the main body for retaining the throat plate in contact with the table. Preferably the retainer assembly is pivotally attached to the main body and/or is movable between a first position contacting the table and a second position bypassing the table. The retaining assembly may pivot about an axis substantially perpendicular to a plane of the table. The retainer assembly may also include an extension that contacts underside of the table. The extension in turn may include a camming surface contacting the underside of the table.

28 Claims, 4 Drawing Sheets

THROAT PLATE FOR A TOOL

This is a request for filing a continuation application under 37 CFR §1.53(b), of prior application Ser. No. 09/356,312, filed on Jul. 16, 1999 now U.S. Pat. No. 6,076,445, which is a continuation of prior application Ser. No. 09/151,421, filed on Sep. 10, 1998, now U.S. Pat. No. 5,970,835.

FIELD OF THE INVENTION

This invention relates generally to throat plates for tools, preferably power tools.

BACKGROUND OF THE INVENTION

FIG. 1 shows a power tool 10 incorporating a prior art throat plate 11 on table 13. The power tool shown in FIG. 1 is a table saw, but persons skilled in the art should recognize that the invention is applicable to any tool having a cutting tool through a table, at least momentarily. Similarly, the cutting tool 12 shown in FIG. 1 is a circular blade, but persons skilled in the art will recognize that the invention is equally applicable to any other cutting tools, such as drill bits, grinder wheels, sanding wheels, linear edge blade including, but not limited to, scroll saw blades, band saw blades, jigsaw blades, hole saw blades, etc. Preferably the cutting tool 12 is driven by a motor (not shown).

Throat plate 11 is typically fixedly attached to table 13 by screws 14. However, operators may want to change the throat plate 11 to accommodate wider cutting tools 12. Accordingly, it is preferable to provide a throat plate that is easy to install and/or remove.

SUMMARY OF THE INVENTION

In accordance with the present invention, an improved throat plate is employed. The throat plate includes a main body, an opening in the main body for allowing a cutting tool to extend therethrough, and a retainer assembly attached to the main body for retaining the throat plate in contact with the table. Preferably the retainer assembly is pivotally attached to the main body and/or is movable between a first position contacting the table and a second position bypassing the table. The retaining assembly may pivot about an axis substantially perpendicular to a plane of the table. The retainer assembly may also include an extension that contacts underside of the table. The extension in turn may include a camming surface contacting the underside of the table.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
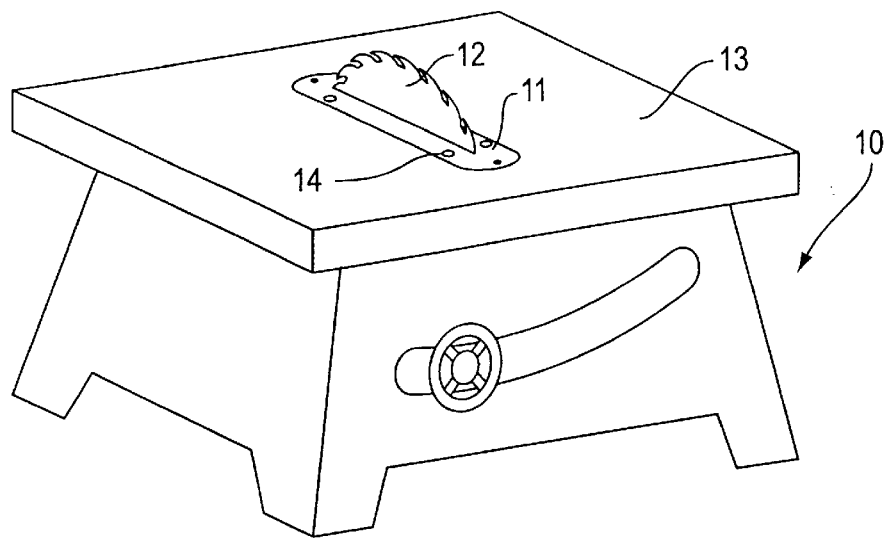
FIG. 1 illustrates a typical prior art throat plate installed on a power tool.
Figure 2:
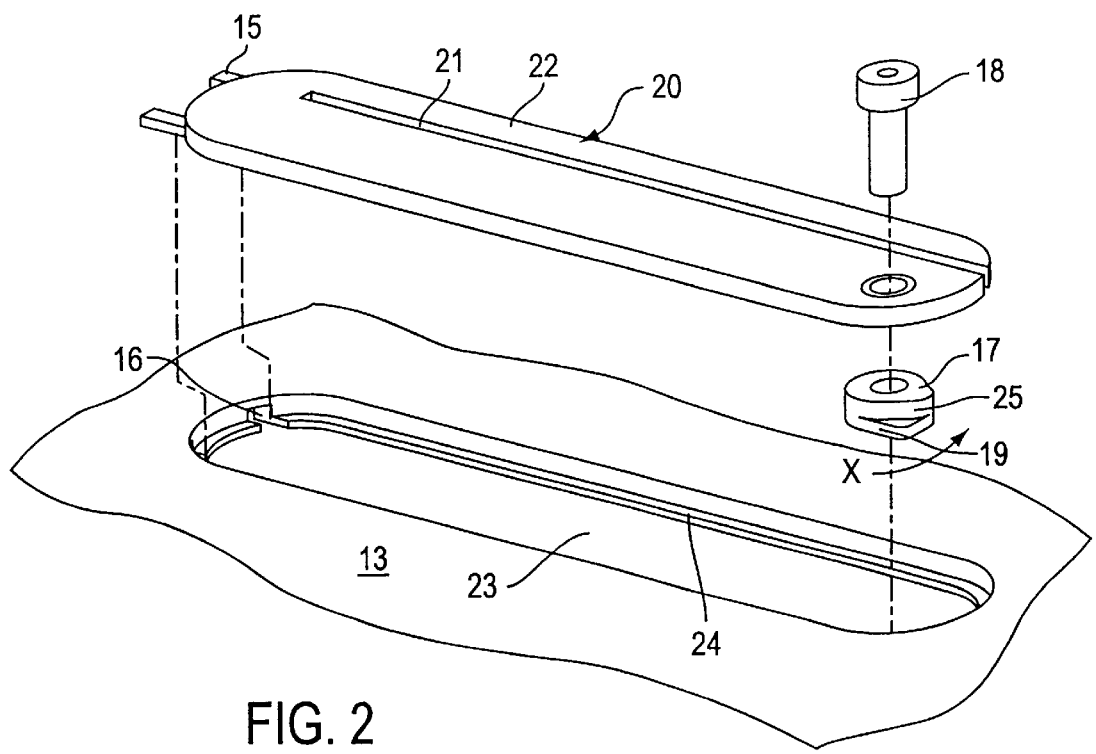
FIG. 2 is an exploded view of a throat plate according to a first embodiment of the present invention.
Figure 3:
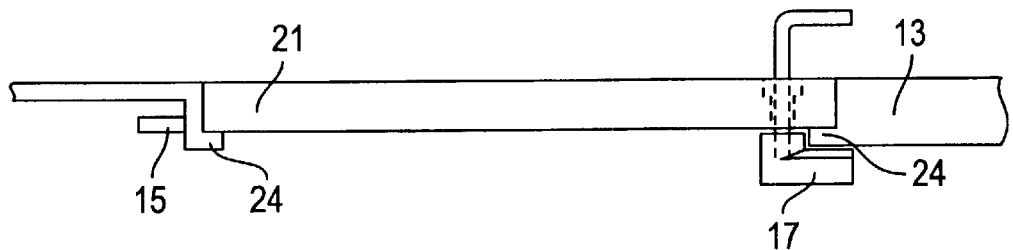
FIG. 3 is a partial cross-sectional side view of the throat plate according to the first embodiment.
Figure 4:
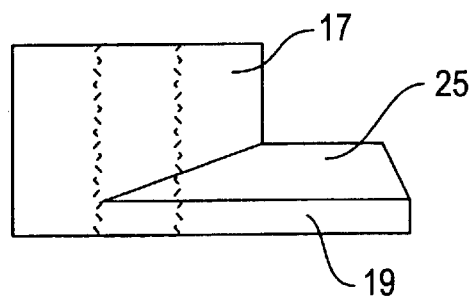
FIGS. 4 and 5 are side and front views, respectively, of a retainer assembly according to the first embodiment.
Figure 5:
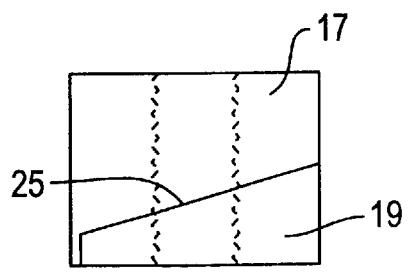

The invention is now described with reference to the accompanying figures, wherein like numerals designate like parts. Referring to FIGS. 1–5, a throat plate 20 according to the present invention is installed within an opening 23 on table 13. Preferably, table 13 has a lip 24 for supporting the throat plate 20.

Throat plate 20 basically comprises a main body 22, and a slot or hole 21 in the main body 22 for allowing a cutting tool to extend therethrough. The throat plate also includes a retainer assembly 17 which is pivotally attached to main body 22 via a screw 18. Retainer assembly 17 preferably has an extension 19. Extension 19 can be pivoted between a first position bypassing table 13 and second position contacting table 13 and locking throat plate 20.

Extension 19 may have a surface 25 that contacts the underside of table 13 and/or lip 24. Preferably, surface 25 is inclined so that, as retainer assembly 17 is rotated, surface 25 will act as a cam and secure the throat plate. Preferably lip 24 will have a stop (not shown) to limit the movement of extension 19, so that the user does not accidentally pivot extension 19 past the contacting/locking position.

Main body 22 preferably has retaining tabs 15 that engage slots 16 in table 13. Accordingly, with such construction, an operator can install throat plate by inserting the tabs 15 into slots 16, lowering the main body 22, and rotating screw 18, preferably less than 360° C., which in turn rotates extension 19 of retainer assembly 17, securely locking throat plate 20 in place.

Figure 6A:
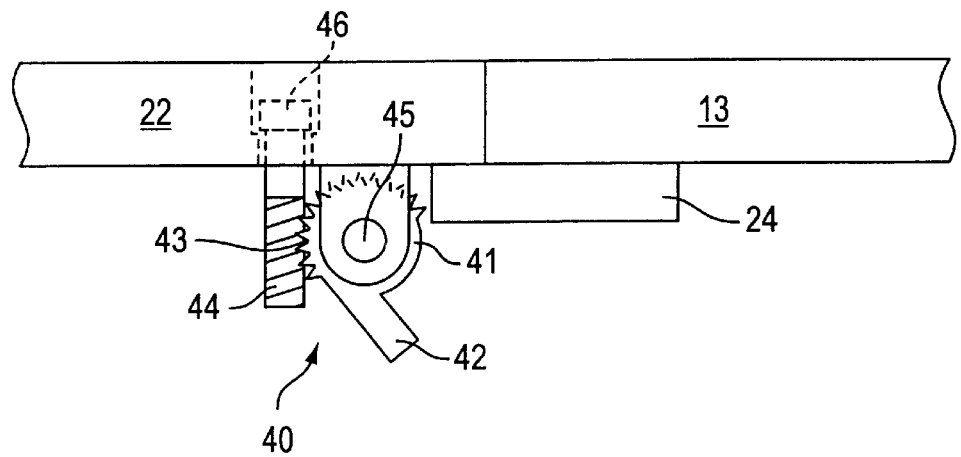
FIGS. 6A and 6B are partial cross-sectional side views of the throat plate according to a second embodiment of the present invention.
Figure 6B:
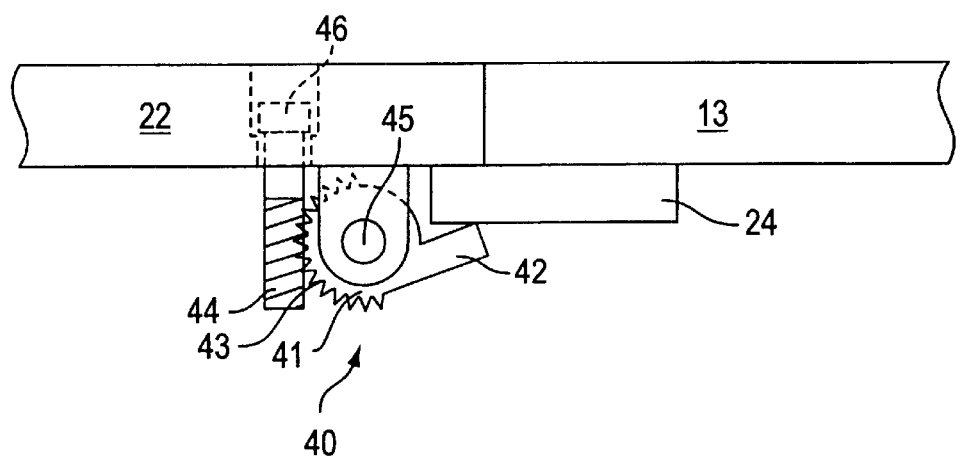

A second embodiment of the present invention is shown in FIGS. 6A–6B, where like numerals refer to like parts. Retainer assembly 40 comprises a body 41, which is pivotably attached to main body 22 via a pin 45. Persons skilled in the art will recognize that, in this embodiment, body 41 rotates about an axis substantially parallel to the plane of table 13, whereas in the first embodiment, retainer assembly 17 rotated about an axis substantially perpendicular to the plane of table 13.

Body 41 preferably has an extension 42. Body 41 and/or extension 42 can be pivoted between a first position bypassing table 13 (FIG. 6A) and second position contacting table 13 (FIG. 6B). Body 41 may have a worm gear 43 that meshes with the threads 44 of screw 46, so that the rotational movement of screw 46 is translated into the rotational body 41 and/or extension 42. Preferably screw 46 is permanently installed on main body 22 so that it cannot be removed therefrom.

Accordingly, with such construction, an operator can install throat plate by inserting the tabs 15 into slots 16, lowering the main body 22, and rotating screw 46, which in turn rotates extension 42 of retainer assembly 40, securely locking throat plate 20 in place.

Figure 7A:
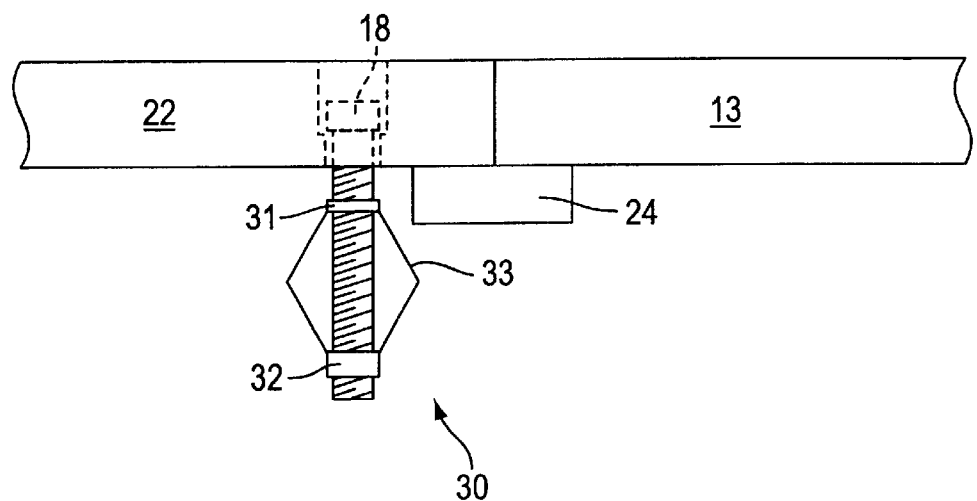
FIGS. 7A and 7B are partial cross-sectional side views of the throat plate according to a third embodiment of the present invention.
Figure 7B:
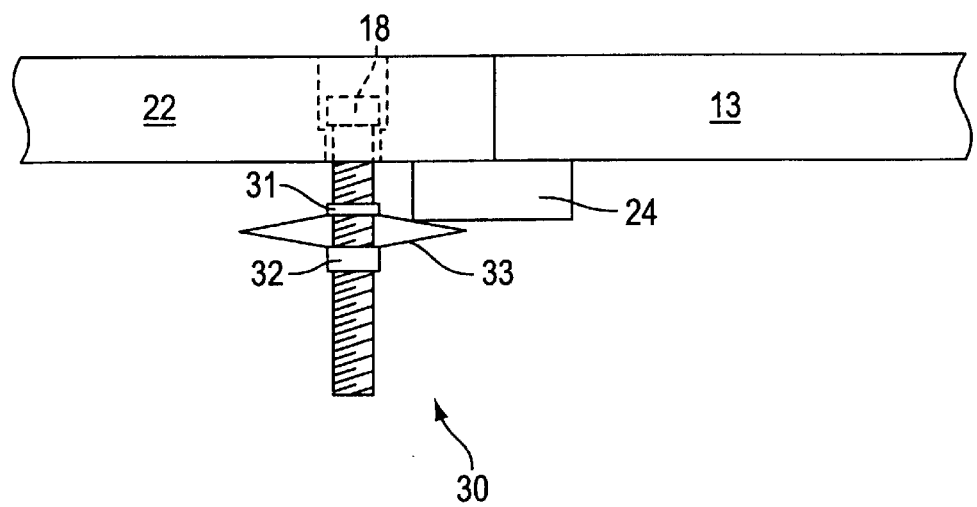

A third embodiment of the present invention is shown in FIGS. 7A–7B, where like numerals refer to like parts. Retainer assembly 30 comprises a screw 18, preferably permanently attached to main body 22 so that it cannot be removed therefrom, a movable part 32 threadingly attached to the screw 18 and at least one holder strip 33 attached to movable part 32 and screw 18. Retainer assembly 30 may also comprise a fixed part 31 fixedly attached to screw 18 and connected to the holder strip 33.

Accordingly, upon rotation of screw 18, the movable part 32 will move along the screw 18, forcing the holder strip 33 to bend or straighten out. In other words, the holder strip 33 can be moved between a first position bypassing table 13 (FIG. 7A) and second position contacting table 13 (FIG. 7B). Because the holder strip 33 will be folded and unfolded many times, it is preferable to use a long-lasting material that will not break upon folding, such as plastic, lead or steel. Alternatively, strip 33 can be made of two parts connected by a hinge.

With such construction, an operator can install throat plate by inserting the tabs 15 into slots 16, lowering the main body 22, and rotating screw 18, which in turn moves movable part 32 and folds holder strip 33, securely locking throat plate 20 in place.

Persons skilled in the art may recognize other alternatives to the means disclosed herein. However, all these additions and/or alterations are considered to be equivalents of the present invention.

What is claimed is:

1. A throat plate for a tool comprising a table, the throat plate comprising:
    a main body;
    an opening in said main body for allowing a cutting tool to extend therethrough; and
    a retainer assembly attached to the main body for retaining the throat plate in contact with the table, wherein the retainer assembly has an inclined surface that contacts the table.
2. The throat plate of claim 1, wherein the retainer assembly is pivotally attached to the main body.
3. The throat plate of claim 1, wherein the retainer assembly comprises an extension that contacts underside of the table.
4. The throat plate of claim 3, wherein the extension comprises a camming surface contacting the underside of the table.
5. The throat plate of claim 1, wherein the retainer assembly is movable between a first position contacting the table and a second position bypassing the table.
6. The throat plate of claim 1, wherein the main body further comprises at least one retaining tab.
7. The throat plate of claim 1, wherein the retaining assembly pivots about an axis substantially perpendicular to a plane of the table.
8. The throat plate of claim 1, wherein the retaining assembly is pivotably attached to the main body via a screw.
9. The throat plate of claim 8, wherein the retaining assembly is pivoted by pivoting the screw.
10. A tool comprising:
    a table;
    a cutting tool extending through the table; and
    a throat plate comprising:
        a main body;
        an opening in said main body for allowing a cutting tool to extend therethrough; and
        a retainer assembly attached to the main body for retaining the throat plate in contact with the table, wherein the retainer assembly has an inclined surface that contacts the table.
11. The tool of claim 1, wherein the retainer assembly is pivotally attached to the main body.
12. The tool of claim 10, wherein the retainer assembly comprises an extension that contacts underside of the table.
13. The tool of claim 10, wherein the retainer assembly is movable between a first position contacting the table and a second position bypassing the table.
14. The tool of claim 10, wherein the main body further comprises at least one retaining tab.
15. The tool of claim 10, wherein the retaining assembly is pivotably movable.
16. The tool of claim 10, wherein the retaining assembly pivots about an axis substantially perpendicular to a plane of the table.
17. The tool of claim 10, wherein the retaining assembly is pivotably attached to the main body via a screw.
18. The tool of claim 17, wherein the retaining assembly is pivoted by pivoting the screw.
19. The tool of claim 10, wherein the cutting tool is one from the group consisting of circular blades, drill bits, grinder wheels, sanding wheels, linear edge blades, scroll saw blades, band saw blades, jigsaw blades and hole saw blades.
20. The tool of claim 10, wherein the cutting tool is driven by a motor.
21. The throat plate of claim 1, wherein the retaining assembly is rotatably connected to a screw.
22. The throat plate of claim 21, wherein the retaining assembly is pivoted by pivoting the screw.
23. The throat plate of claim 21, wherein the retaining assembly comprises a gear that meshes with the screw.
24. The throat plate of claim 1, wherein the extension contacts underside of the table.
25. The tool of claim 10, wherein the retaining assembly is rotatably connected to a screw.
26. The tool of claim 25, wherein the retaining assembly is pivoted by pivoting the screw.
27. The tool of claim 25, wherein the retaining assembly comprises a gear that meshes with the screw.
28. The tools of claim 25, wherein the extension contacts underside of the table.

* * * * *